Jan. 30, 1968  S. PAPETTI  3,366,659
SILICON CONTAINING ORGANOBORANES
Filed Sept. 20, 1963
FIGURE I
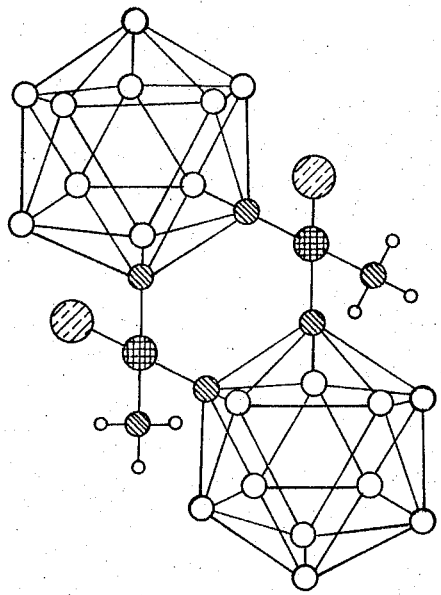
FORMULA I
○ BORON
◉ CARBON
⊕ SILICON
▨ CHLORINE
∘ HYDROGEN ON CARBON
   (HYDROGEN ON BORON
   OMITTED FOR CLARITY)
INVENTOR:
STELVIO PAPETTI
BY Walter D. Hunter
AGENT

United States Patent Office 3,366,659
Patented Jan. 30, 1968

3,366,659
SILICON CONTAINING ORGANOBORANES
Stelvio Papetti, Hamden, Conn., assignor to Olin Mathieson Chemical Corporation, a corporation of Virginia
Filed Sept. 20, 1963, Ser. No. 310,978
2 Claims. (Cl. 260—448.2)

ABSTRACT OF THE DISCLOSURE

Cyclic silicon-containing organoboranes are prepared by reacting with a stoichiometric excess of water at a temperature of about 0° C. to about 150° C. a compound of the formula:

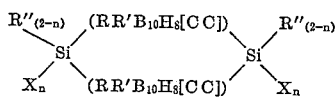

wherein R and R' are each selected from the group consisting of hydrogen and an alkyl radical having 1 to 5 carbon atoms, R" is an alkyl radical having 1 to 5 carbon atoms or phenyl, X is a halogen selected from the group consisting of chlorine, bromine, and iodine, and $n$ is an integer of from 1 to 2 inclusive.

---

This invention relates to silicon-containing organoboranes and to a method for their manufacture.

The novel silicon-containing organoboranes of this invention have the formula:

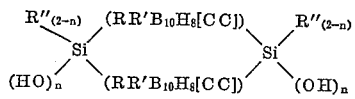

wherein R and R' are each selected from the group consisting of hydrogen and an alkyl radical having from 1 to 5 carbon atoms, R" is an alkyl radical having from 1 to 5 carbon atoms or phenyl and $n$ is an integer of from 1 to 2 inclusive.

In preparing the novel silicon-containing compounds of this invention an organoborane compound of the formula:

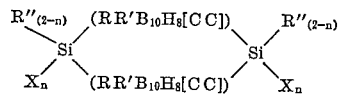

wherein R and R' are each selected from the group consisting of hydrogen and an alkyl radical having 1 to 5 carbon atoms, R" is an alkyl radical having 1 to 5 carbon atoms or phenyl, X is a halogen selected from the group consisting of chlorine, bromine, and iodine, and $n$ is an integer of from 1 to 2 inclusive, is reacted with a stoichiometric excess of water.

The organoborane starting materials can be prepared by the method set forth in Papetti application Ser. No. 310,423, filed Sept. 20, 1963 for Composition and Process. For example, the compound of the formula:

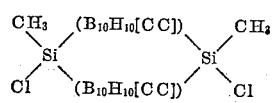

can be made by reacting carborane $$(B_{10}H_{10}[C(H)C(H)])$$

successively with butyl lithium and bis (dichloro methylsilyl) carborane in the presence of diethyl ether and at ice-water bath temperature.

Compounds of the carborane type can be prepared by the reaction of decaborane or an alkylated decaborane having one to two alkyl groups containing 1 to 5 carbon atoms in each alkyl group with an acetylenic hydrocarbon containing from two to ten carbon atoms in the presence of a wide variety of ethers, nitriles or amines. The preparation of these compounds is described in application Ser. No. 741,976, filed June 13, 1958 of Ager, Heying and Mangold, now abandoned. For example, carborane $(B_{10}H_{10}[C(H)C(H)])$ can be made by reacting for about 12 hours at 125° C. a mixture of decaborane and tetrahydrofuran in an autoclave pressured to 100 p.s.i. with acetylene.

Generally, the reaction is carried out at room temperature although temperatures of from about 0° C. to about 150° C. can be employed, if desired. Preferably the reaction temperature is maintained between about 0° C. and about 100° C. A stoichiometric excess of water is required in this novel hydrolysis reaction and, generally, from about 2.5 moles to about 250 moles or more of water will be employed per mole of the organoboron compound charged to the reactor. The reaction will usually be completed in from about 0.05 hour to about 4 hours or more depending upon the particular reaction conditions. It has been found in the reaction that the product can be conveniently separated from the reaction mixture by a variety of methods including extraction, evaporation of the reaction mixture followed by crystallization and filtration, etc. Although the reaction is ordinarily carried out at atmospheric pressures, if desired, pressures varying from subatmospheric up to about +5 atmospheres or more can be employed.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

Preferably the reaction is carried out in the presence of a water-miscible solvent. Suitable solvents include, for example, acetone, ethyl acetate, acetonitrile, dimethyl ether of diethylene glycol, and dioxane and mixtures of such solvents.

Organoboranes suitable as starting materials include, for example:

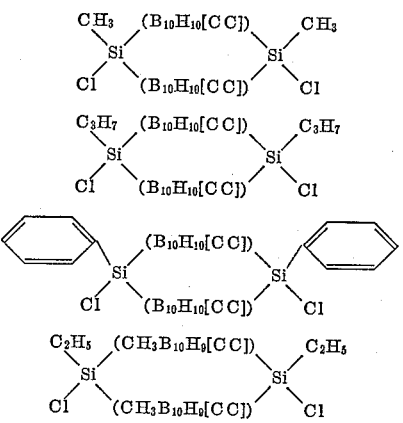

and

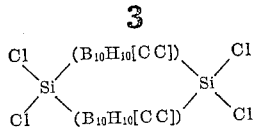

together with the corresponding bromine and iodine derivatives.

The following examples illustrate specific embodiments of this invention and are not to be considered limitative.

In the examples the term "mole" signifies "gram moles."

*Example I*

A total of 1.5 g. (0.0037 mole) of the compound:

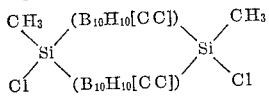

was weighed out and dissolved in 50 ml. of a benzene-acetone mixture prepared by mixing together 50 ml. of benzene and 30 ml. of acetone. To this solution 40 ml. of water-acetone mixture prepared from 20 ml. of water and 100 ml. of acetone was added slowly at room temperature. To the cloudy reaction mixture obtained, sufficient additional acetone was added to redissolve the solid material yielding a clear solution. After the solution had been stirred at room temperature for 1.25 hours, the reaction mixture was concentrated under reduced pressure and finally reduced to dryness. A quantitative yield of the following product was obtained:

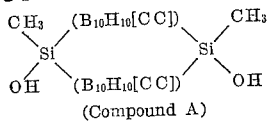

(Compound A)

which had melting point of 304° C.

*Analysis.*—Calc'd for $C_6H_{28}B_{20}O_2Si_2$: C, 17.79; H, 6.97; B, 54.47; Si, 13.87. Found: C, 17.00; H, 6.98; B, 54.10; Si, 13.94.

*Example II*

Under an atmosphere of dry nitrogen 3.159 g. of the compound:

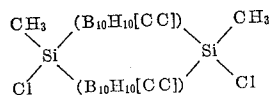

was weighed out and placed in a flask equipped with a magnetic stirrer. A total of 150 ml. of acetone was added with stirring followed by the addition of 25 ml. of distilled water. The resulting mixture was heated at reflux for 2 hours and then reduced to dryness under vacuum. After the solid product thus obtained had been dried in a vacuum desiccator for two hours, a total of 2.873 g. of the compound:

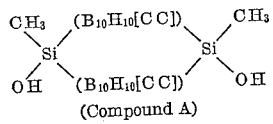

(Compound A)

a white solid, was collected. This corresponds to a yield of 99 percent based on the weight of the starting organoborane compound charged to the reactor.

The structural formula of Compound A is the same as structural Formula I in FIGURE 1 with the exception that the two Cl substituents are each replaced by an OH group.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellent mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

What is claimed is:

1. Silicon-containing organoboron compounds of the formula:

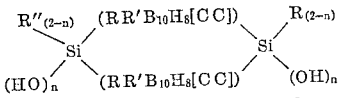

wherein R and R' are each selected from the group consisting of hydrogen and an alkyl radical having 1 to 5 carbon atoms, R" is selected from the group consisting of an alkyl radical of from 1 to 5 carbon atoms and the phenyl radical, and n is an integer of from 1 to 2 inclusive.

2.

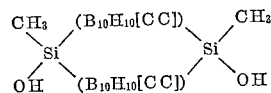

References Cited

UNITED STATES PATENTS 3,223,474  12/1965  Nitzsche et al. _____ 260—448.2

TOBIAS E. LEVOW, *Primary Examiner.*

P. F. SHAVER, *Assistant Examiner.*